United States Patent Office 3,262,903
Patented July 26, 1966

3,262,903
GREEN CHROMIUM OXIDE PIGMENT IN EPOXY RESIN AND PHOSPHATIZED EPOXY RESIN COATINGS
James A. Robertson, Lewiston, N.Y., assignor to E. I. du Pont de Nemours and Company, Wilmington, Del., a corporation of Delaware
No Drawing. Filed June 27, 1963, Ser. No. 290,910
6 Claims. (Cl. 260—37)

This invention relates to polymeric phosphates, and more particularly to coating compositions comprising phosphated epoxide polymers and a particular pigment.

Phosphated epoxide polymers obtained by the reaction of an epoxide polymer containing more than one epoxy group

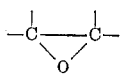

per molecule, with phosphoric acid (hereinafter referred to as a "phosphated polyepoxide"), are known in the art, being disclosed for example, in U.S. Patent 2,541,027, issued to Bradley, and U.S. Patents 2,692,876 and 2,723,-971, issued to Cupery. These phosphated polyepoxides are known to be useful as the film-forming ingredient for coating compositions which provide corrosion-resistant coating films for metal substrates.

When an epoxide polymer containing more than one epoxy group per molecule (hereinafter referred to as a "polyepoxide") is reacted with orthophosphoric acid ($H_3PO_4$), the acid effects an opening of the epoxy groups to provide a polymer having phosphoric acid ester substituents, according to the following scheme:

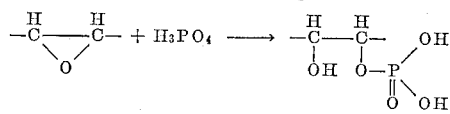

These acidic phosphate groups effect a phosphatizing surface conversion on the metal substrate to which the phosphated polyepoxide is applied. It is disclosed in the art, particularly in the three aforementioned patents, that to provide an effective phosphated polyepoxide, the polyepoxide must be reacted with sufficient orthophosphoric acid to so react with at least half of the available epoxy groups, but the molar amount of orthophosphoric acid must be less than the number of moles of epoxy groups contained in the polyepoxide. The excess of residual epoxy groups render the phosphated polyepoxide curable. Thus, these phosphated polyepoxides are valuable as the film-forming ingredients in coating compositions, since these phosphated polyepoxides provide a relatively moisture-impermeable film containing passivating acidic phosphate groups and which cures to form hard, corrosion-resistant coating films.

The phosphated polyepoxides most commonly used in the art are (1) the reaction product of a polyepoxide which comprises a glycidyl ether of a polyhydric phenol, with orthophosphoric acid, such as described in the Bradley patent, and (2) the reaction product of a polyepoxide which comprises 40–98% by weight of copolymerized ethylenically unsaturated epoxy-free monomer and 2–60% by weight of copolymerized ethylenically unsaturated epoxy monomer, with orthophosphoric acid, such as described in the two Cupery patents.

An object of this invention is to provide an improved phosphated polyepoxide composition. Another object is to provide a coating composition comprising a phosphated polyepoxide and a particular pigment which imparts improved corrosion resistance properties to the composition. Other objects will be obvious to those skilled in the art from the following descripiton of this invention.

These objects are fully attained by the composition comprising (1) the reaction product of a polyepoxide containing more than one epoxy group per molecule, with orthophosphoric acid in an amount equal to at least 0.5 and less than 1.0 mole of orthophosphoric acid per epoxy group, and (2) about 2 to 30 parts by weight of green chromium oxide per 100 parts by weight of said reaction product.

As used herein, the term "polyepoxide" refers to a polymer or resin having more than one epoxy group

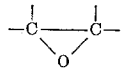

the term "phosphated polyepoxide" refers to the reaction product of a polyepoxide with orthophosphoric acid; the term "epoxy monomer" refers to a monomer having at least one epoxy group; the term "epoxy-free monomer" refers to a monomer which does not contain any epoxy groups.

The phosphated polyepoxides of this invention may be derived from any of the normally solid polyepoxides known in the art including those described in Lee and Neville, Epoxy Resins, McGraw-Hill Book Company, New York (1957), Chapter 1. Suitable polyepoxides include the complex epoxy-hydroxy polyethers, such as described in U.S. Patents 2,456,408 and 2,592,560 issued to Greenlee, which are obtained by the catalyzed condensaton of polyhydric phenols or alcohols with an epoxy-contributing compound such as epihalohydrins and alkylene oxides. Typical polyhydric phenols include the mononuclear phenols such as resorcinol, catechol and hydroquinone and the polynuclear phenols such as bis-(4-hydroxyphenyl) methane, 2,2-bis-(4-hydroxyphenyl) propane (also known as bisphenol A) and 2,2-bis-(4-hydroxy-2-methylphenyl) propane. Typical polyhydric alcohols include ethylene glycol, glycerine and trimethylol propane. Epichlorohydrin is the preferred epoxy-contributing compound. The polyepoxides of this class which are particularly preferred are those obtained by the reaction of bisphenol A and epichlorohydrin. The formula of these materials may be expressed as follows:

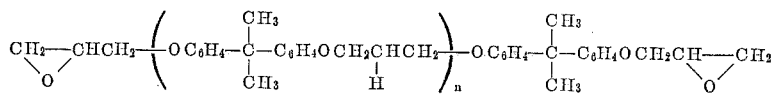

where $n$ is an integer such as 0, 1, 2, 3 . . . etc.

Other suitable polyepoxides include the epoxidized polymers of pre-polymerized ethylenically unsaturated monomers, for example, the familiar epoxidized polydienes, such as the epoxidized polybutadienes disclosed in U.S. Patent 3,030,336 issued to Greenspane, et al.

Still other suitable polyepoxides include the copolymers which contain at least one copolymerized ethylenically unsaturated epoxy monomer and at least one copolymerized ethylenically unsaturated epoxy-free monomer. Examples of suitable epoxy monomers include but are not limited to the following: allyl glycidyl ether, vinyl glycidyl ether, glycidyl methacrylate, glycidyl acrylate, vinyl glycidyl phthalate, allyl glycidyl phthalate, butadiene monoepoxide, isoprene monoepoxide, divinyl benzene monoepoxide and vinyl cyclohexene monoepoxide. Glycidyl methacrylate is a preferred epoxy monomer because of its ease of polymerization to high molecular weight products. Allyl glycidyl ether and vinyl glycidyl ethers are other preferred epoxy monomers. In the preparation of such copolymers for use in this invention, the epoxy monomer polymerizes by addition polymerization through the ethylenically unsaturated group leaving the epoxy group

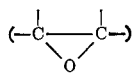

intact and attached directly or indirectly to the carbon backbone of the copolymer at intervals along the copolymer chain. The epoxy group is attached directly to the carbon backbone of the copolymer with certain epoxy monomers such as butadiene monoepoxide and isoprene monoepoxide; while with most other epoxy monomers, for example, glycidyl methacrylate, allyl glycidyl ether, and divinyl benzene monoepoxide, the epoxy group is attached indirectly to the carbon backbone through intermediate oxygen and/or carbon atoms. The ethylenically unsaturated epoxy-free monomers which can be used include but are not limited to the following; acrylate and methacrylate esters of $C_1$ to $C_{18}$ alcohols such as methyl methacrylate, ethyl acrylate, butyl methacrylate, and lauryl methacrylate; vinyl esters of $C_1$ to $C_{18}$ aliphatic monocarboxylic acids, such as vinyl acetate, vinyl propionate and vinyl stearate; styrene and substituted styrenes; acrylonitrile; vinyl chloride, vinylidene chloride; ethylene; and dienes such as butadiene and isoprene. Epoxy-free monomers containing hydroxyl, amino, or carboxyl groups, for example, β-hydroxyethyl methacrylate, β-dimethylaminoethyl methacrylate, and acrylic acid may also be used; but since these groups react with epoxy groups, the copolymers should be prepared and stored under conditions which are known to retard or inhibit premature reaction between these groups.

It is essential that the polyepoxide of this invention be reacted with at least 0.5 mole of orthophosphoric acid ($H_3PO_4$) per mole of allyl glycidyl ether unit in the polyepoxide. If less than this amount of orthophosphoric acid is reacted with the polyepoxide there is insufficient acidic phosphate for effective surface conversion of the metal substrate with the result that the phosphated polyepoxide coating film is deficient in corrosion resistance properties. It is also essential that the polyepoxide be reacted with less than 1.0 mole of orthophosphoric acid per mole of allyl glycidyl ether unit. There must be some residual epoxy groups in the phosphated polyepoxide to effect cross-linking between polymer chains, and to thereby provide hard, durable coating films. To insure optimum properties, it is preferred that the polyepoxide be reacted with orthophosphoric acid in an amount equal to 0.6 to 0.9 mole of orthophosphoric acid per mole of allyl glycidyl ether. The most preferred phosphated polyepoxide of this invention is the reaction product of the polyepoxide with orthophosphoric acid in an amount equal to about 0.75 mole of orthophosphoric acid per mole of allyl glycidyl ether.

The reaction between the polyepoxide and the orthophosphoric acid may be accomplished by any suitable process. Preferably, this reaction is carried out in a solution of the polymer in an organic solvent to minimize the possibility of cross-linking the polyepoxide. The solvent should be substantially inert toward epoxide groups and also miscible with and inert toward the phosphoric acid. Suitable solvents include the aromatic hydrocarbons, such as benzene, toluene, and the xylenes; aliphatic and aromatic ketones such as acetone, methyl ethyl ketone, cyclobutanone, and acetophenone; acyclic or cyclic ethers such as di-n-butyl ether, dioxane, tetrahydrofuran, and diphenylene oxide; and the like. The polymer solution may be of any concentration within the range of about 1–75% by weight of polymer in the solution, with the preferred range being 20 to 40% by weight.

It is preferred to use the standard sirupy orthophosphoric acid containing about 85% by weight of orthophosphoric acid. The orthophosphoric is added to the polymer solution, with stirring, to obtain the desired phosphate polyepoxide. To prevent localized reaction, the orthophosphoric acid should be added to the polymer solution as a mixture of the acid in the same solvent as used in the polymer solution and at a concentration approximately equal to the concentration of the polymer solution. The reaction solution may be used directly to prepare the coating composition of this invention.

It is known in the art that the phosphated polyepoxides of this invention may be pigmented with a variety of common pigments for use as coating compositions. In preparing the phosphated polyepoxide coating compositions of the prior art it is the common practice to incorporate the pigment into the composition in a pigment volume concentration (PVC) of at least 40%, and usually higher. Pigment volume concentration is defined by the following formula:

$$PVC = \frac{\text{volume of pigment}}{\text{volume of pigment} + \text{volume of resin}}$$

Thus, for a composition comprising a phosphated polyepoxide having a density of unity and green chromium oxide ($Cr_2O_3$) having a density of 5.2, a PVC of 40% is equivalent to 346% by weight of green chromium oxide based on the weight of phosphated polyepoxide, or 346 parts by weight of green chromium oxide per 100 parts of phosphated polyepoxide.

Comparing the relative corrosion resistance of coatings of a given phosphated polyepoxide composition on a steel substrate, a composition containing green chromium oxide in a pigment volume concentration of only 30% (215 parts by weight $Cr_2O_3$ per 100 parts of phosphated polyepoxide) or higher actually is considerably less effective than a clear, unpigmented composition. Therefore, it is very surprising that such a composition containing about 2 to 30 parts by weight of green chromium oxide per 100 parts by weight of phosphated polyepoxide is considerably more effective than the clear, unpigmented composition. These corrosion resistance properties are even more surprising in view of the fact that compositions of the same phosphated polyepoxide, containing comparable amounts of various common pigments, including chrome yellow, chrome orange, red iron oxide, brown iron oxide, antimony oxide, red lead, white lead, titanium dioxide, powdered aluminum, and calcium carbonate, at best give only modest improvement in corrosion resistance, and in many instances are considerably less effective than the clear, unpigmented composition.

The composition of this invention may be prepared in any suitable manner. For example, the green chromium oxide may be dispersed into a solution of the phosphated polyepoxide. A suitable pigment dispersing agent such as potassium tripolyphosphate may be used if desired. A convenient way in which to disperse the green chromium oxide into the composition is to add a sufficient amount of the phosphated polyepoxide solution to the pigment to form a flowable paste which may then be added to the composition.

Other ingredients commonly incorporated into polymeric coating compositions may also be used in the composition of this invention such as, inert extenders including talc, mica, calcium carbonate, and clays; pigment dispersing agents such as potassium tripolyphosphate; antifoam agents; thickening agents such as casein, polyvinyl alcohol, hydroxy ethyl cellulose and carboxy methyl cellulose; mildew inhibitors; other film-forming materials which are compatible with the phosphated polyepoxides of this invention and which are mutually soluble in the same solvents, such as urea-formaldehyde resins, melamine-formaldehyde resins, alkyl resins and other natural and synthetic polymers; and the like.

This invention is further illustrated by the following examples. In these examples, the phosphated polyepoxides prepared from vinyl chloride and oxirane monomers were "alkali insoluble," i.e., the bulk of the product was insoluble in 5 percent aqueous sodium hydroxide. In these examples, except where noted, the phosphated polyepoxide solutions were prepared by the following procedure: Sixty parts by weight of the monomers, consisting of 85% by weight of vinyl chloride and 15% of allyl glycidyl ether, were dissolved in 40 parts by weight of benzene together with 1%, based on the weight of monomers, of azodiisobutyronitrile, and heated at 75° C. until the polymerization was complete (4 to 8 hours). The polyepoxide was precipitated from the benzene by adding petroleum ether to the solution. The resultant polyepoxide, containing 89.5% by weight of vinyl chloride and 10.5% of allyl glycidyl ether, was dried in a vacuum. The component proportions were determined by analysis for percent oxirane oxygen as described by Swern et al., Analytical Chemistry, vol. 19, No. 6 (1947) pp. 414–415. This polyepoxide was then redissolved in tetrahydrofuran (THF) to form a solution containing 30 parts by weight of polyepoxide and 70 parts by weight of THF. To this THF solution was added with stirring, a second solution of 30 parts by weight of orthophosphoric acid (sirupy phosphoric acid containing about 85% by weight of $H_3PO_4$) and 60 parts by weight of THF. This second solution was added in an amount to provide 0.75 mole of orthophosphoric acid per mole of allyl glycidyl ether unit in the polyepoxide. In all of the examples (except where a clear, unpigmented phosphated polyepoxide solution was prepared for comparative purposes), a small amount of the resultant phosphated polyepoxide solution was added to the pigment which was then milled in a ball mill for 4 hours to form a flowable paste. This paste was added to the phosphated polyepoxide solution to provide the pigment concentration shown (pigment concentrations are given in these examples as percent by weight of pigment based on the weight of phosphated polyepoxide). The resultant compositions were then coated onto 24 gauge, 4 x 12 inches, polished steel panels. The panels were baked at 150° C. for 30 minutes, and then tested as follows: Each panel was scratched to bare metal with a knife to form scribe marks in the shape of an X across the entire panel surface. Each panel was also cupped with a ½ inch diameter Olsen cup to a 300 mil. depth (resulting in a 20% reduction in film thickness over the cup) according to ASTM standard 20 Part II 298 (1920). These panels were then subjected to the accelerated salt spray corrosion test described in ASTM standard B117–57T. The salt spray cabinet used in this test was operated at 95° F. with fog condensation rate of 0.7–2.0 ml. per hour through a 5 inch funnel, using 5% brine. Exposure times, in hours, required to give ¼ inch corrosion layback in both directions from the scribe marks (a total of ½ inch corrosion failure), and to give ½ inch diameter corrosion failure on the Olsen cup, were determined and are noted in the examples. All of the data shown in these examples represent the results of at least two trials.

*Example 1*

This example demonstrates the relative corrosion resistance of a clear, unpigmented phosphated polyepoxide composition, and several phosphated polyepoxide compositions containing various different pigments to show the effect of pigments other than green chromium oxide. The results of this example are shown in Table 1:

TABLE 1

| Test No. | Pigment | Film Thickness, Mils | Hours to ½" Corrosion failure | |
|---|---|---|---|---|
| | | | Scribe | Olsen Cup |
| 1 | None | 0.7–1.1 | 504 | 264 |
| 2 | 25% chrome yellow | 1.0–1.7 | 504 | 504 |
| 3 | 25% chrome orange | 0.8–1.3 | 504 | 504 |
| 4 | 25% red iron oxide | 0.9–1.3 | 504 | 504 |
| 5 | 25% $Sb_2O_3$ | 1.2–1.7 | 504 | 504 |
| 6 | 12% aluminum powder | 1.4–1.8 | 504 | 264 |
| 7 | 37% red lead | 0.6–1.2 | 360 | 264 |
| 8 | 27% $TiO_2$ | 0.7–1.3 | 360 | 264 |
| 9 | 25% white lead | 0.9–1.7 | 264 | 264 |
| 10 | 25% brown iron oxide | 0.9–1.7 | 264 | 168 |
| 11 | 8% $CaCO_3$ | 0.7–1.4 | 264 | 168 |

This example shows that the pigments used in Tests 2, 3, 4, and 5 did not improve the corrosion resistance of the phosphated polyepoxide for the scribe test, as compared to the clear, unpigmented composition, although there was an improvement in the Olsen cup test. The pigment used in Test 6 had no effect on the corrosion resistance of the composition. The pigments used in Tests 7, 8, and 9 actually degraded the corrosion resistance of the composition for the scribe test, and did not affect the corrosion resistance for the Olsen cup test. The pigmented compositions used in Tests 10 and 11 were entirely far less effective than the clear, unpigmented phosphated polyepoxide composition.

*Example 2*

This example demonstrates the relative corrosion resistance of a clear, unpigmented phosphated polyepoxide composition and compositions of this invention. The results of this example are summarized in Table 2.

TABLE 2

| Test No. | Pigment | Film Thickness, Mils | Hours to ½" Corrosion | |
|---|---|---|---|---|
| | | | Scribe | Olsen Cup |
| 1 | None | 0.7–1.1 | 504 | 264 |
| 2 | 3% $Cr_2O_3$ | 0.7–1.5 | 648 | 1,000 |
| 3 | 6% $Cr_2O_3$ | 0.7–1.5 | 648 | 1,000 |
| 4 | 12% $Cr_2O_3$ | 0.7–1.5 | 648 | 1,000 |
| 5 | 25% $Cr_2O_3$ | 0.7–1.5 | 648 | 1,000 |

These data show that the phosphated polyepoxide compositions of this invention containing about 2–30 parts by weight of green chromium oxide per 100 parts of phosphated polyepoxide are surprisingly more effective than the clear, unpigmented phosphated polyepoxide composition.

*Example 3*

In this example various phosphated polyepoxide compositions were prepared, coated onto panels, and the panels were Olsen cupped, as described above. These panels were exposed to the atmosphere in the open, at Niagara Falls, New York, for a period of 3 months. The results of this example are summarized in Table 3, wherein the extent of the corrosion failure over the Olsen cup is recorded:

TABLE 3

| Test No. | Pigment | Film Thickness, Mils | 3 month Outdoor Exposure: Extent of Corrosion, Olsen Cup, inch |
|---|---|---|---|
| 1 | None | 0.7–1.1 | ½ |
| 2 | 25% Cr$_2$O$_3$ | 0.7–1.5 | None |
| 3 | 25% chrome yellow | 0.1–1.7 | (¹) |
| 4 | 25% chrome orange | 0.8–1.3 | (¹) |
| 5 | 25% Sb$_2$O$_3$ | 1.2–1.7 | ½ |
| 6 | 37% red lead | 0.6–1.2 | ⅝ |
| 7 | 37% TiO$_2$ | 0.7–1.3 | ⅜–½ |
| 8 | 12% aluminum powder | 0.7–1.4 | ½ |
| 9 | 8% CaCO$_3$ | 0.7–1.4 | ¾ |
| 10 | 25% white lead | 0.7–1.2 | ⅝ |

¹ Slight.

This example demonstrates the considerable superiority of the composition of this invention in terms of outdoor durability as compared to the clear, unpigment composition, and the compositions containing other pigments.

*Example 4*

This example demonstrates the effect of green chromium oxide added to a phosphated polyepoxide composition in amounts greater than about 30 parts by weight of pigment per 100 parts of phosphated polyepoxide. In this example, phosphated polyepoxide compositions containing 91 parts by weight of vinyl chloride and 9 parts of allyl glycidyl ether were prepared as described above except that the tetrahydrofuran was replaced by a solvent mixture consisting of 35% by weight of methyl ethyl ketone, 30% of xylene, and 35% of diacetone alcohol. The results of this example are summarized in Table 4:

TABLE 4

| Test No. | Pigment | Film Thickness, Mils | Hours to ½″ Corrosion failure | |
|---|---|---|---|---|
| | | | Scribe | Olsen Cup |
| 1 | None | 0.8–1.0 | 408 | 336 |
| 2 | 55% Cr$_2$O$_3$ | 0.8–1.0 | 500 | 330 |
| 3 | 215% Cr$_2$O$_3$ | 0.8–1.0 | 165 | 70 |

As shown by these data, a phosphated polyepoxide composition containing 55 parts by weight of green chromium oxide per 100 parts of phosphated polyepoxide provides a modest increase in corrosion resistance for the scribe test, as compared to the clear, unpigmented composition and a slight decrease in corrosion resistance for the Olsen cup test. The composition containing 215 parts by weight of green chromium oxide per 100 parts of phosphated polyepoxide is considerably less effective than the clear, unpigmented composition.

*Example 5*

A phosphated polyepoxide solution was containing 95 parts by weight of vinyl chloride and 5 parts of vinyl glycidyl ether by the procedure described above except that the tetrahydrofuran was replaced by a solvent mixture consisting of 65% by weight of acetone and 35% of methyl isobutyl ketone. To a portion of this phosphated polyepoxide solution was added 25 parts by weight of green chromium oxide per 100 parts of phosphated polyepoxide. This pigmented phosphated polyepoxide composition was coated onto the panels. Other panels were coated with the clear, unpigmented phosphated polyepoxide composition. These coated panels were scribed and Olsen cupped and then subjected to the accelerated salt spray corrosion test. The results of this example are summarized in Table 5:

TABLE 5

| Test No. | Pigment | Film Thickness, Mils | Hours to ½″ Corrosion failure | |
|---|---|---|---|---|
| | | | Scribe | Olsen Cup |
| 1 | None | 0.7–0.9 | 240 | 120 |
| 2 | 25% Cr$_2$O$_3$ | 0.8–1.3 | 408 | 204 |

*Example 6*

Thirty parts by weight of a commercially available, solid (bisphenol A)-epichlorohydrin condensation product, were dissolved in 70 parts by weight of a solvent mixture consisting of 65% by weight of tetrahydrofuran and 35% by weight of methyl isobutyl ketone. To this solution was added a second solution of 30 parts by weight of orthophosphoric acid (sirupy phosphoric acid containing about 85% by weight of H$_3$PO$_4$) and 60 parts by weight of the same solvent mixture. This second solution was added in an amount to provide 0.75 mole of orthophosphoric acid per epoxy group of the (bisphenol A)-epichlorohydrin condensation product. To a portion of this phosphated polyepoxide solution was added 25 parts by weight of green chromium oxide per 100 parts of phosphated polyepoxide. This pigmented phosphated polyepoxide composition was coated onto the panels (film thickness, 0.7–0.9 mils) and Olsen cupped as described above. Other panels were coated with the clear, unpigmented phosphated polyepoxide composition (film thickness, 0.7–0.9 mils) and Olsen cupped. These coated panels were then subjected to the accelerated salt spray corrosion test. The panels coated with the composition containing green chromium oxide showed ½ inch of corrosion over the Olsen cups after 384 hours of exposure whereas the panels coated with clear, unpigmented composition failed after only 240 hours.

What is claimed is:

1. The composition comprising (1) the reaction product of a normally solid polyepoxide having more than one epoxy group per molecule, with orthophosphoric acid in an amount equal to at least 0.5 and less than 1.0 molecule of orthophosphoric acid per epoxy group, and (2) about 2 to 30 parts by weight of green chromium oxide per 100 parts by weight of said reaction product.

2. Composition of claim 1, wherein said amount of orthophosphoric acid is 0.6–0.9 molecule per said epoxy group.

3. Composition of claim 2, wherein said polyepoxide is a glycidyl ether of a dihydric phenol.

4. Composition of claim 2, wherein said reaction product is alkali-insoluble and said polyepoxide consists essentially of combined ethylenically unsaturated monomers of which 40 to 98 weight percent is epoxy-free.

5. Composition of claim 4, wherein said monomers consist essentially of vinyl chloride and allyl glycidyl ether.

6. Composition of claim 4, wherein said monomers consist essentially of vinyl chloride and vinyl glycidyl ether.

References Cited by the Examiner

UNITED STATES PATENTS

| | | | |
|---|---|---|---|
| 2,692,876 | 10/1954 | Cupery | 260—30.4 |
| 2,723,971 | 11/1955 | Cupery | 260—28.5 |
| 2,793,932 | 5/1957 | Kahler | 148—6.16 |
| 2,800,422 | 7/1957 | Piccinelli | 148—6.16 |

(Other references on following page)

UNITED STATES PATENTS

| | | | |
|---|---|---|---|
| 2,961,341 | 11/1960 | Long | 117—75 |
| 2,990,497 | 6/1961 | Rugg | 260—37 |
| 2,991,262 | 7/1961 | Johnston | 260—27 |
| 3,123,582 | 3/1964 | Tryzna | 260—37 |

OTHER REFERENCES

Siemens, Schuckertwerke Aktiengesellschaft, German application 1,120,134, printed Dec. 21, 1961 (Kl. 39b 22/10), 2 pp. spec., no drawing. 260–37.

References Cited by the Applicant

UNITED STATES PATENTS 2,541,027  2/1951  Bradley.

ALLAN LIEBERMAN, *Acting Primary Examiner.*

MORRIS LIEBMAN, *Examiner.*

J. W. BEHRINGER, J. E. CALLAGHAN,
*Assistant Examiners.*

UNITED STATES PATENT OFFICE
CERTIFICATE OF CORRECTION

Patent No. 3,262,903                                       July 26, 1966

James A. Robertson

It is hereby certified that error appears in the above numbered patent requiring correction and that the said Letters Patent should read as corrected below.

Column 2, lines 40 and 41, for "condensaton" read -- condensation --; same column 2, about lines 58 to 64, for that portion of the formula reading $$\overset{|}{H} \quad\quad \text{read} \quad\quad \overset{|}{O}H$$

column 6, TABLE 2, in the heading to the last columns, after "Corrosion" insert -- Failure --; column 7, TABLE 3, third column, line 3 thereof, for "0.1-1.7" read -- 1.0-1.7 --.

Signed and sealed this 1st day of August 1967.

(SEAL)
Attest:

EDWARD M. FLETCHER, JR.                      EDWARD J. BRENNER
Attesting Officer                             Commissioner of Patents